United States Patent
Liu et al.

(10) Patent No.: US 11,601,517 B2
(45) Date of Patent: Mar. 7, 2023

(54) COMMUNICATIONS METHOD, AND COMMUNICATIONS APPARATUS AND SYSTEM

(71) Applicant: HUAWEI TECHNOLOGIES CO., LTD., Shenzhen (CN)

(72) Inventors: Hai Liu, Shenzhen (CN); Jian Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/476,844

(22) Filed: Sep. 16, 2021

(65) Prior Publication Data
US 2022/0021743 A1 Jan. 20, 2022

Related U.S. Application Data

(63) Continuation of application No. PCT/CN2019/079318, filed on Mar. 22, 2019.

(51) Int. Cl.
*G06F 15/16* (2006.01)
*H04L 67/55* (2022.01)
*H04L 12/28* (2006.01)
*H04L 67/52* (2022.01)
*H04L 101/622* (2022.01)

(52) U.S. Cl.
CPC ............ *H04L 67/55* (2022.05); *H04L 12/281* (2013.01); *H04L 67/52* (2022.05); *H04L 2101/622* (2022.05)

(58) Field of Classification Search
None
See application file for complete search history.

(56) References Cited

U.S. PATENT DOCUMENTS

| | | | | |
|---|---|---|---|---|
| 2011/0029370 A1* | 2/2011 | Roeding | ............... | H04W 4/021 705/14.38 |
| 2011/0177829 A1* | 7/2011 | Platt | ...................... | H04W 4/023 455/456.2 |
| 2011/0312278 A1* | 12/2011 | Matsushita | ............. | H04W 4/80 455/66.1 |

(Continued)

FOREIGN PATENT DOCUMENTS

| | | |
|---|---|---|
| CN | 104330973 A | 2/2015 |
| CN | 104486747 A | 4/2015 |

(Continued)

*Primary Examiner* — Phyllis A Book
(74) *Attorney, Agent, or Firm* — Maier & Maier, PLLC

(57) ABSTRACT

A communications method and a communications apparatus and system are provided, and are applied to smart home systems. The method includes: a home device sends operation information to a server, where the operation information is used to indicate an operation performed by a user on the home device; and after receiving the operation information from the home device, the server determines a target account, where the target account is one of accounts associated with the home device, and sends a notification message to a target terminal device, where the notification message includes status information used to indicate a status of the home device, the status information is related to the operation information, and the target terminal device is a terminal device on which the target account is logged in.

18 Claims, 8 Drawing Sheets

(56) References Cited

U.S. PATENT DOCUMENTS

| | | | | |
|---|---|---|---|---|
| 2015/0113172 A1* | 4/2015 | Johnson | ................ | H04L 67/75 709/245 |
| 2015/0365787 A1* | 12/2015 | Farrell | .................... | H04W 4/02 455/456.1 |
| 2016/0065688 A1* | 3/2016 | Li | ......................... | G06F 16/95 709/225 |
| 2016/0078484 A1* | 3/2016 | Emigh | .................... | G01S 5/015 705/14.58 |
| 2016/0352784 A1 | 12/2016 | Oh | | |
| 2019/0281408 A1* | 9/2019 | Zhao | .................... | H04W 4/021 |
| 2021/0266735 A1* | 8/2021 | Hu | ........................ | H04W 12/02 |

FOREIGN PATENT DOCUMENTS

| | | | | |
|---|---|---|---|---|
| CN | 104767639 A | 7/2015 | | |
| CN | 105744471 A | 7/2016 | | |
| CN | 106487622 A | 3/2017 | | |
| CN | 106936693 A | 7/2017 | | |
| CN | 107770371 A | 3/2018 | | |
| CN | 106487622 B | * 10/2019 | ......... | H04L 12/2807 |
| EP | 3211836 A1 | 8/2017 | | |
| EP | 3252998 A1 | 12/2017 | | |
| KR | 20160140185 A | 12/2016 | | |

\* cited by examiner

COMMUNICATIONS METHOD, AND COMMUNICATIONS APPARATUS AND SYSTEM

CROSS-REFERENCE TO RELATED APPLICATIONS

This application is a continuation of International Application No. PCT/CN2019/079318, filed on Mar. 22, 2019, the disclosure of which is hereby incorporated by reference in its entirety.

TECHNICAL FIELD

The embodiments relate to the communications field, and in particular, to a communications method, and a communications apparatus and system.

BACKGROUND

As shown in FIG. 1, an existing smart home system includes a smart home cloud, a smart home application (APP) installed on a terminal device, and smart home devices (for example, an air conditioner, a refrigerator, and a rice cooker). Generally, a plurality of different accounts may be logged in on a plurality of smart home APPs to perform an operation on a same smart home device. When an account is logged in on a smart home APP to perform an operation on a smart home device, the smart home cloud only needs to push status information of the smart home device to the account.

However, currently, when a user directly performs an operation on a smart home device, the device reports status information to the smart home cloud. In this case, the smart home cloud does not know an account the status information should be pushed to. Consequently, the smart home cloud pushes the status information to all accounts that have subscribed to the status information of the device, or pushes, by default, the status information to all accounts that have been bound to the device. As a result, some unwanted information is inevitably received by some accounts, and this deteriorates user experience.

SUMMARY

Embodiments provide a communications method, and a communications apparatus and system, to prevent unwanted information from being received by an account of a user, thereby enhancing user experience.

To achieve the foregoing objective, the following solutions are used in the embodiments.

According to a first aspect, a communications method and a corresponding communications apparatus are provided. In this solution, a server receives operation information from a home device, where the operation information is used to indicate an operation performed by a user on the home device; the server determines a target account, where the target account is one of accounts associated with the home device; and the server sends a notification message to a target terminal device, where the notification message includes status information used to indicate a status of the home device, the status of the home device is related to the operation information, and the target terminal device is a terminal device on which the target account is logged in. In this embodiment, when a user directly controls the home device, the server can determine a target account from a plurality of accounts, and send the notification message including the status information of the home device to the target terminal device on which the target account is logged in. This prevents the server from pushing a notification message to all accounts that have subscribed to the status information of the home device, and prevents unwanted information from being received by an account other than the target account, thereby enhancing user experience.

In a possible implementation, that the server determines a target account includes: the server obtains global positioning system (GPS) location information of one or more terminal devices, where the one or more terminal devices are logged in by the accounts associated with the home device; the server determines GPS location information that is in the GPS location information of the one or more terminal devices and that is closest to a GPS location of the home device; and the server determines, as the target account, an account logged in on a terminal device corresponding to the GPS location information closest to the GPS location of the home device.

In a possible implementation, that the server obtains GPS location information of one or more terminal devices includes: the server sends a GPS location information query message to the one or more terminal devices, where the one or more terminal devices are the terminal devices on which the accounts associated with the home device are logged in, and the one or more terminal devices include the target terminal device; and the server receives GPS location information from each of the one or more terminal devices.

In a possible implementation, before the server determines the account of the user who currently controls the home device, the communications method provided in this embodiment further includes: the server receives network access GPS location information, where the network access GPS location information is GPS location information that is of a network access terminal device and that is present when the home device performs network access by using the network access terminal device; and the server determines the network access GPS location information as the GPS location information of the home device.

In a possible implementation, the operation information includes a voice instruction of the user, and that the server determines a target account includes: the server recognizes voiceprint information of the user based on the voice instruction of the user; and the server determines, based on a pre-established correspondence between voiceprint information and an account, an account corresponding to voiceprint information that best matches the voiceprint information of the user as the target account.

In a possible implementation, before the server determines the target account, the communications method provided in this embodiment further includes: the server receives information that is about an account associated with the home device and that comes from one or more terminal devices and voice information of a user associated with the account; the server recognizes voiceprint information of the user based on the voice information of the user; and the server establishes a correspondence between voiceprint information of a user and an account of the user based on the voiceprint information of the user and the information about the account of the user.

In a possible implementation, that the server determines a target account includes: the server obtains a media access control (MAC) address of one or more terminal devices, where the one or more terminal devices are logged in by the accounts associated with the home device, and the one or more terminal devices and the home device are located in a same network; the server determines a MAC address corresponding to a highest signal strength of the network in the MAC address of the one or more terminal devices; and the server determines, as the target account, an account logged in on a terminal device corresponding to the MAC address corresponding to the highest signal strength of the network.

In a possible implementation, that the server obtains a MAC address of one or more terminal devices includes: the server obtains a sorting result of a MAC address of the one or more devices having a network connection function that are in the same network as the home device, where the sorting result of the MAC address is obtained based on a signal strength of the network corresponding to a MAC address of each of the one or more devices, and the one or more devices having a wireless connection function include a terminal device on which the accounts associated with the home device are logged in.

In a possible implementation, that the server obtains a MAC address of one or more terminal devices includes: the server obtains a MAC address of the one or more devices having a network connection function that are in the same network as the home device and a signal strength of the network corresponding to a MAC address of each of the one or more devices, where the one or more devices having a wireless connection function include a terminal device on which the accounts associated with the home device are logged in.

In a possible implementation, that the server obtains a MAC address of one or more terminal devices includes: the server sends a MAC address related information query message to one or more first terminal devices; the server receives MAC address related information from the one or more first terminal devices, where the MAC address related information may include: a MAC address of the first terminal device, an identifier of a network corresponding to the MAC address of the first terminal device, and a signal strength of the network corresponding to the MAC address of the first terminal device; and the server obtains, from the MAC address related information of the one or more first terminal devices, the MAC address of the one or more terminal devices that are in the same network as the home device, where the one or more first terminal devices are the terminal devices on which the accounts associated with the home device are logged in.

In a possible implementation, before the server determines the target account, the communications method provided in this embodiment further includes: the server receives a MAC address from each of the one or more terminal devices and an account corresponding to the MAC address of the terminal device; and the server establishes a correspondence between an account associated with the home device and a MAC address of a terminal device, where the one or more terminal devices are logged in by the accounts associated with the home device.

According to a second aspect, a communications method and a corresponding communications apparatus are provided. In this solution, a terminal device receives a notification message from a server, where the terminal device is a target terminal device, the target terminal device is a terminal device on which a target account determined by the server is logged in, the target account is one of accounts associated with a home device, the notification message includes status information used to indicate a status of the home device, the status of the home device is related to operation information, the operation information is sent by the home device to the server, and the operation information is used to indicate an operation performed by a user on the home device; and the terminal device determines the status of the home device based on the notification message. In this embodiment, the terminal device on which the target account determined by the server is logged in receives the notification message from the server. This prevents unwanted information from being received by an account of another user, thereby enhancing user experience. Further, the terminal device may determine the status of the home device based on the notification message from the server, to perform a subsequent operation.

In a possible implementation, the communications method provided in this embodiment further includes: the terminal device sends first information to the server, where the first information is used by the server to determine the target account, the target account is one of the accounts associated with the home device, and the first information includes GPS location information of the terminal device, or includes a MAC address of the terminal device, an identifier of a network corresponding to the MAC address, and a signal strength of the network corresponding to the MAC address.

According to a third aspect, a communications method and a corresponding communications apparatus are provided. In this solution, a home device obtains operation information, where the operation information is used to indicate an operation performed by a user on the home device, a terminal device on which a target account is logged in is a target terminal device, the target terminal device is a terminal device receiving a notification message sent by a server, the notification message includes status information used to indicate a status of the home device, and the status of the home device is related to the operation information; and the home device sends the operation information to the server. In this embodiment, after the home device sends the operation information to the server, the server may determine the target account, and send the notification message to the target terminal device on which the target account is logged in. This prevents unwanted information from being received by an account of another user, thereby enhancing user experience.

In a possible implementation, the communications method provided in this embodiment further includes: the home device obtains MAC address related information of one or more devices having a network connection function that are in a same network as the home device, where the MAC address related information is used by the server to determine the target account, the target account is one of accounts associated with the home device, and the one or more devices having a wireless connection function include a terminal device on which the accounts associated with the home device are logged in; and the home device sends the MAC address related information to the server.

In a possible implementation, the MAC address related information of the one or more devices that are in the same network as the home device includes a sorting result of a MAC address of the one or more devices, where the sorting result of the MAC address is obtained based on a signal strength of the network corresponding to a MAC address of each of the one or more devices.

In a possible implementation, the MAC address related information of the one or more devices that are in the same network as the home device includes a MAC address of the one or more devices and a signal strength of the network corresponding to a MAC address of each of the one or more devices.

According to a fourth aspect, a communications apparatus is provided to implement the foregoing methods. The communications apparatus may be the server in the first aspect or an apparatus including the server. Alternatively, the communications apparatus may be the terminal device in the second aspect or an apparatus including the terminal device. Alternatively, the communications apparatus may be the home device in the third aspect or an apparatus including the home device. The communications apparatus includes a corresponding module, unit, or means for implementing the foregoing methods. The module, unit, or means may be implemented by hardware, implemented by software, or implemented by hardware executing corresponding software. The hardware or software includes one or more modules or units corresponding to the foregoing functions.

According to a fifth aspect, a communications apparatus is provided, including a processor and a memory. The memory is configured to store computer instructions. When the processor executes the instructions, the communications apparatus is enabled to perform the method in any one of the foregoing aspects. The communications apparatus may be the server in the first aspect or an apparatus including the server. Alternatively, the communications apparatus may be the terminal device in the second aspect or an apparatus including the terminal device. Alternatively, the communications apparatus may be the home device in the third aspect or an apparatus including the home device.

According to a sixth aspect, a communications apparatus is provided, including a processor. The processor is configured to couple to a memory; and after reading instructions in the memory, perform the method in any one of the foregoing aspects according to the instructions. The communications apparatus may be the server in the first aspect or an apparatus including the server. Alternatively, the communications apparatus may be the terminal device in the second aspect or an apparatus including the terminal device. Alternatively, the communications apparatus may be the home device in the third aspect or an apparatus including the home device.

According to a seventh aspect, a computer-readable storage medium is provided. The computer-readable storage medium stores instructions. When the instructions are run on a communications apparatus, a computer is enabled to perform the method in any one of the foregoing aspects.

According to an eighth aspect, a computer program product including instructions is provided. When the computer program product is run on a communications apparatus, a computer is enabled to perform the method in any one of the foregoing aspects.

According to a ninth aspect, a communications apparatus (for example, the communications apparatus may be a chip or a chip system) is provided. The communications apparatus includes a processor, configured to implement functions in any one of the foregoing aspects. In a possible implementation, the communications apparatus further includes a memory. The memory is configured to store necessary program instructions and data. When the communications apparatus is a chip system, the communications apparatus may include a chip, or may include a chip and another discrete device.

For effects brought by any implementation manner in the fourth aspect to the ninth aspect, refer to the effects brought by different implementation manners in the first aspect, the second aspect, or the third aspect. Details are not described herein again.

According to a tenth aspect, a communications system is provided. The communications system includes the server in the first aspect, the terminal device in the second aspect, and the home device in the third aspect.

DETAILED DESCRIPTION OF EMBODIMENTS

The following describes the solutions in the embodiments with reference to the accompanying drawings in the embodiments. In the description, "I" indicates that associated objects are in an "or" relationship unless otherwise specified. For example, A/B may represent A or B. In the embodiments, "and/or" describes only an association relationship for describing associated objects and represents that three relationships may exist. For example, A and/or B may represent the following three cases: only A exists, both A and B exist, and only B exists, where A and B may be singular or plural. In addition, in the description, "a plurality of" means two or more than two. "The following at least one (item)" or a similar expression thereof means any combination of these items, including a singular (item) or any combination of plural (items). For example, at least one (item) of a, b, or c may represent a; b; c; a and b; a and c; b and c; or a, b, and c, where a, b, and c each may be in a singular or plural form. In addition, for ease of clear description of the solutions in the embodiments, terms such as "first" and "second" are used in the embodiments to distinguish between same items having a basically same function and effect or similar items. A person of ordinary skill in the art can understand that the terms such as "first" and "second" are not intended to limit a quantity and an execution sequence, and that the terms such as "first" and "second" are unnecessarily limited to be different.

Figure 1:
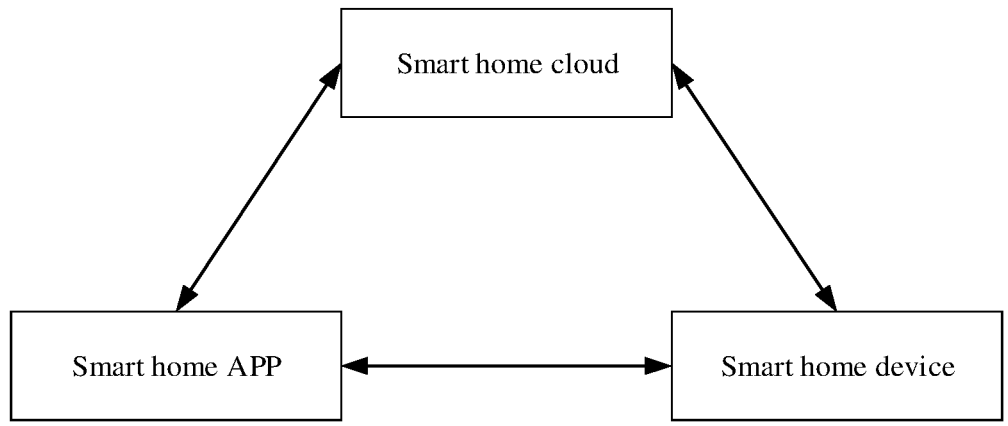
FIG. 1 is a schematic diagram of an existing smart home system.
Figure 2:
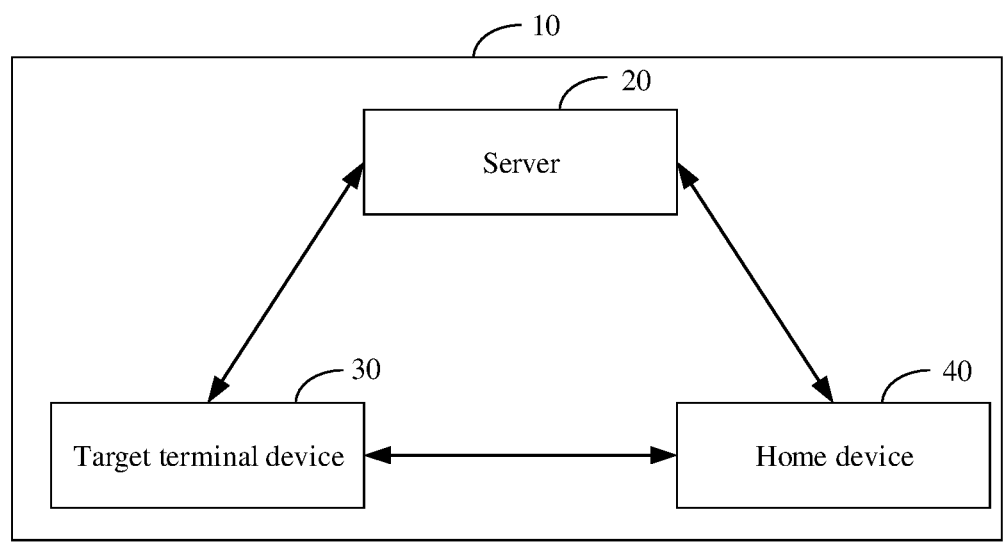
FIG. 2 is a schematic diagram of a smart home system according to an embodiment.

FIG. 2 shows a smart home system 10 according to an embodiment. The smart home system 10 includes a server (which may also be referred to as a smart home cloud) 20, a target terminal device 30, and a home device 40. A smart home APP is installed on the target terminal device 30.

The smart home system 10 shown in FIG. 2 is used as an example. In this embodiment, in a possible implementation, the home device sends operation information to the server, where the operation information is used to indicate an operation performed by a user on the home device. After receiving the operation information from the home device, the server determines a target account, where the target account is one of accounts associated with the home device; and sends a notification message to the target terminal device on which the target account is logged in, where the notification message includes status information used to indicate a status of the home device, the status of the home device is related to the operation information, and the target terminal device is a terminal device on which the target account is logged in. In this embodiment, when the user controls the home device, the server can determine the target account, and send the notification message including the status information of the home device to the target terminal device on which the target account is logged in. This prevents unwanted information from being received by an account other than the target account, thereby enhancing user experience.

It should be noted that interaction between the server and the terminal device in this embodiment can be understood as interaction between the server and an account logged in on the smart home APP running on the terminal device. All the accounts in this embodiment are accounts that are associated with the home device and that can be logged in on the smart home APP running on the terminal device. The smart home APP may be used to control a home device that is connected to a network. A unified description is provided herein, and is not repeated in the following embodiments.

Optionally, the server 20 in this embodiment may be a computer device, may communicate with the home device 40 and provide a service for the home device 40, and may send the status information of the home device 40 to the target terminal device 30.

Optionally, the target terminal device 30 in this embodiment may be a device configured to implement a wireless communication function, for example, a terminal or a chip that may be used in the terminal. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless telephone set, a session initiation protocol (SIP) phone, a wireless local loop (WLL) station, a personal digital assistant (PDA), a handheld device or a computing device that has a wireless communication function, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in a remote medical application, a wireless terminal in a smart grid, a wireless terminal in transportation safety, a wireless terminal in a smart city, a wireless terminal in a smart home, or the like. The terminal may be mobile or immobile.

Optionally, the home device 40 in this embodiment may be a home appliance having a wireless connection function, such as an air conditioner, a refrigerator, a television, a table lamp, a robot, or a microwave oven. A specific form of the home device is not particularly limited in the following embodiments.

Optionally, each of the server 20, the target terminal device 30, and the home device 40 in this embodiment may also be referred to as a communications apparatus and may be a general-purpose device or a dedicated device. This is not limited in this embodiment.

Figure 3:
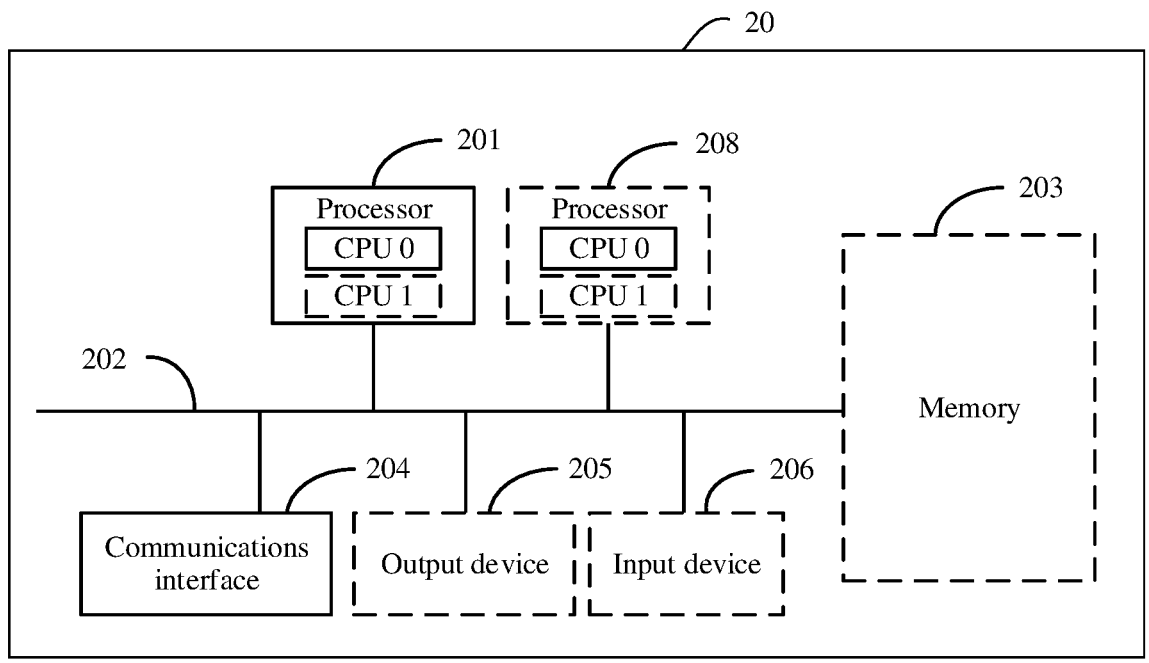
FIG. 3 is a schematic structural diagram of a communications device according to an embodiment.

Optionally, in this embodiment, the target terminal device, the home device, or the server in FIG. 2 may be implemented by a communications device (or a communications apparatus) 20 in FIG. 3. FIG. 3 is a schematic structural diagram of the communications device 20 according to an embodiment. The communications device 20 includes one or more processors 201, a communications bus 202, and at least one communications interface (that a communications interface 204 and one processor 201 are included in FIG. 3 is merely used as an example for description), and may optionally further include a memory 203.

The processor 201 may be a general-purpose central processing unit (CPU), a microprocessor, an application-specific integrated circuit (ASIC), or one or more integrated circuits configured to control execution of programs in the solutions in the embodiments.

The communications bus 202 may be a peripheral component interconnect (PCI) bus, an extended industry standard architecture (EISA) bus, and or the like. The bus may be classified into an address bus, a data bus, a control bus, and the like. For ease of representation, only one thick line is used to represent the bus in FIG. 3, but this does not mean that there is only one bus or only one type of bus. The communications bus 202 is configured to connect different components in the communications device 20, so that the different components can communicate with each other.

The communications interface 204 may be a transceiver module, and is configured to communicate with another device or a communications network, such as an Ethernet network, a radio access network (RAN), or a wireless local area network (WLAN). For example, the transceiver module may be an apparatus such as a transceiver. Alternatively, the communications interface 204 may be a transceiver circuit located in the processor 201, and is configured to implement signal input and signal output of the processor.

The memory 203 may be an apparatus having a storage function. For example, the memory 203 may be a read-only memory (ROM), another type of static storage device that can store static information and instructions, a random-access memory (RAM), or another type of dynamic storage device that can store information and instructions; or may be an electrically erasable programmable read-only memory (EEPROM), a compact disc read-only memory (CD-ROM), other optical disk storage, optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that is accessible by a computer. However, no limitation is imposed thereto. The memory may exist independently, and is connected to the processor through the communications bus 202. Alternatively, the memory may be integrated with the processor.

The memory 203 is configured to store computer executable instructions for performing the solutions in the embodiments, and the processor 201 controls execution of the solutions. The processor 201 is configured to execute the computer executable instructions stored in the memory 203, to implement communications methods provided in the embodiments.

Optionally, in this embodiment, the processor 201 may perform processing-related functions in the communications methods provided in the following embodiments. The communications interface 204 is responsible for communicating with another device or a communications network. This is not limited in this embodiment.

Optionally, the computer executable instructions in this embodiment may also be referred to as application program code. This is not limited in this embodiment.

During specific implementation, in an embodiment, the processor 201 may include one or more CPUs, for example, a CPU 0 and a CPU 1 in FIG. 3.

During specific implementation, in an embodiment, the communications device 20 may include a plurality of processors, for example, the processor 201 and a processor 208 in FIG. 3. Each of the processors may be a single-core CPU, or may be a multi-core CPU. The processors herein may be one or more devices, circuits, and/or processing cores for processing data (for example, computer program instructions).

During specific implementation, in an embodiment, the communications device 20 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive a user input in a plurality of manners. For example, the input device 206 may be a mouse, a keyboard, a touchscreen device, or a sensing device.

Currently, when a user directly performs an operation on a smart home device, the device reports status information to the smart home cloud, and in this case, the smart home cloud does not know which account the status information should be pushed to. Consequently, the smart home cloud pushes the status information to all accounts that have subscribed to the status information of the device, or pushes, by default, the status information to all accounts that have been bound to the device. As a result, some unwanted information is inevitably received by some accounts, deteriorating user experience. In view of this, an embodiment provides a communications method. In the communications method, a home device sends operation information to a server, where the operation information is used to indicate an operation performed by a user on the home device. After receiving the operation information from the home device, the server determines a target account, where the target account is one of accounts associated with the home device; and sends a notification message to a target terminal device on which the target account is logged in, where the notification message includes status information used to indicate a status of the home device, the status of the home device is related to the operation information, and the target terminal device is a terminal device on which the target account is logged in. In this embodiment, when the user controls the home device, the server can determine the target account, and send the notification message including the status information of the home device to the target terminal device on which the target account is logged in. This prevents unwanted information from being received by an account other than the target account, thereby enhancing user experience. With reference to the smart home system 10 shown in FIG. 2, the following details, by using specific embodiments, the communications methods provided in the embodiments.

It should be noted that names of messages between devices, names of parameters in the messages, or other names in the following embodiments are merely examples, and the names thereof may be other names during specific implementation. This is not limited in this embodiment.

Figure 4:
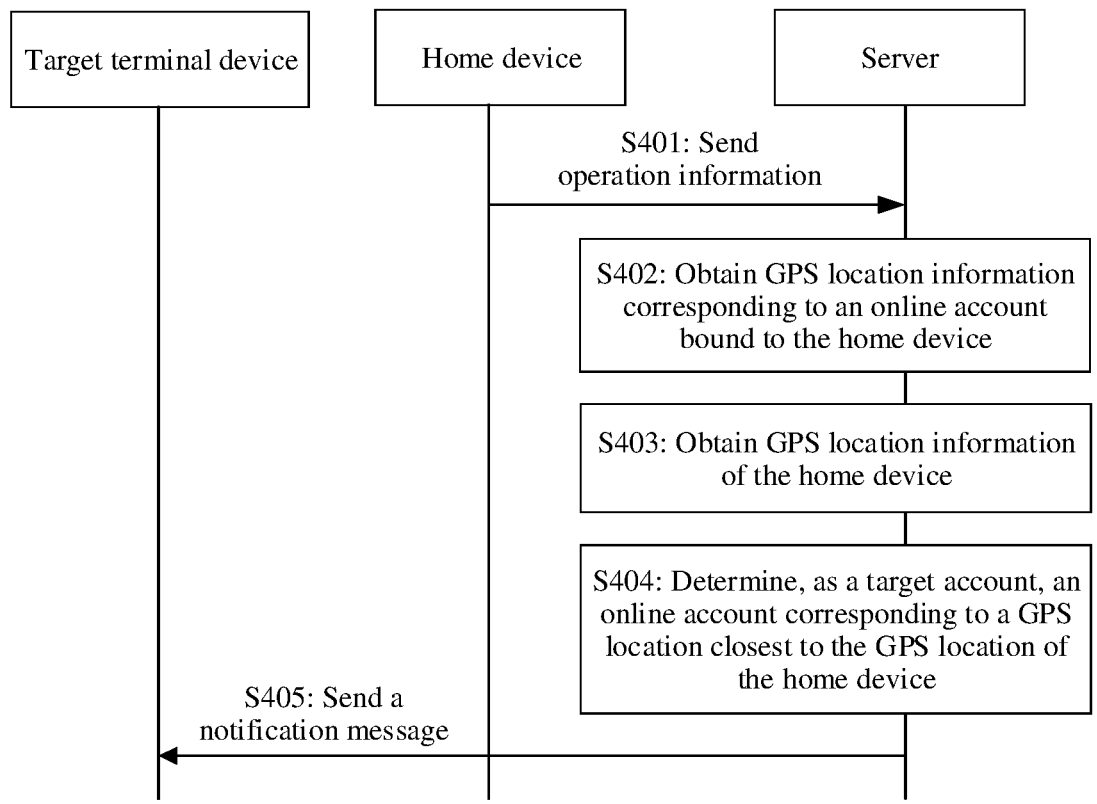
FIG. 4 is a schematic flowchart of a communications method according to an embodiment.

In a possible implementation, as shown in FIG. 4, a communications method provided in the embodiments includes the following steps.

S401: A home device sends operation information to a server. Correspondingly, the server receives the operation information from the home device.

The operation information is used to indicate an operation performed by a user on the home device.

Figure 5:
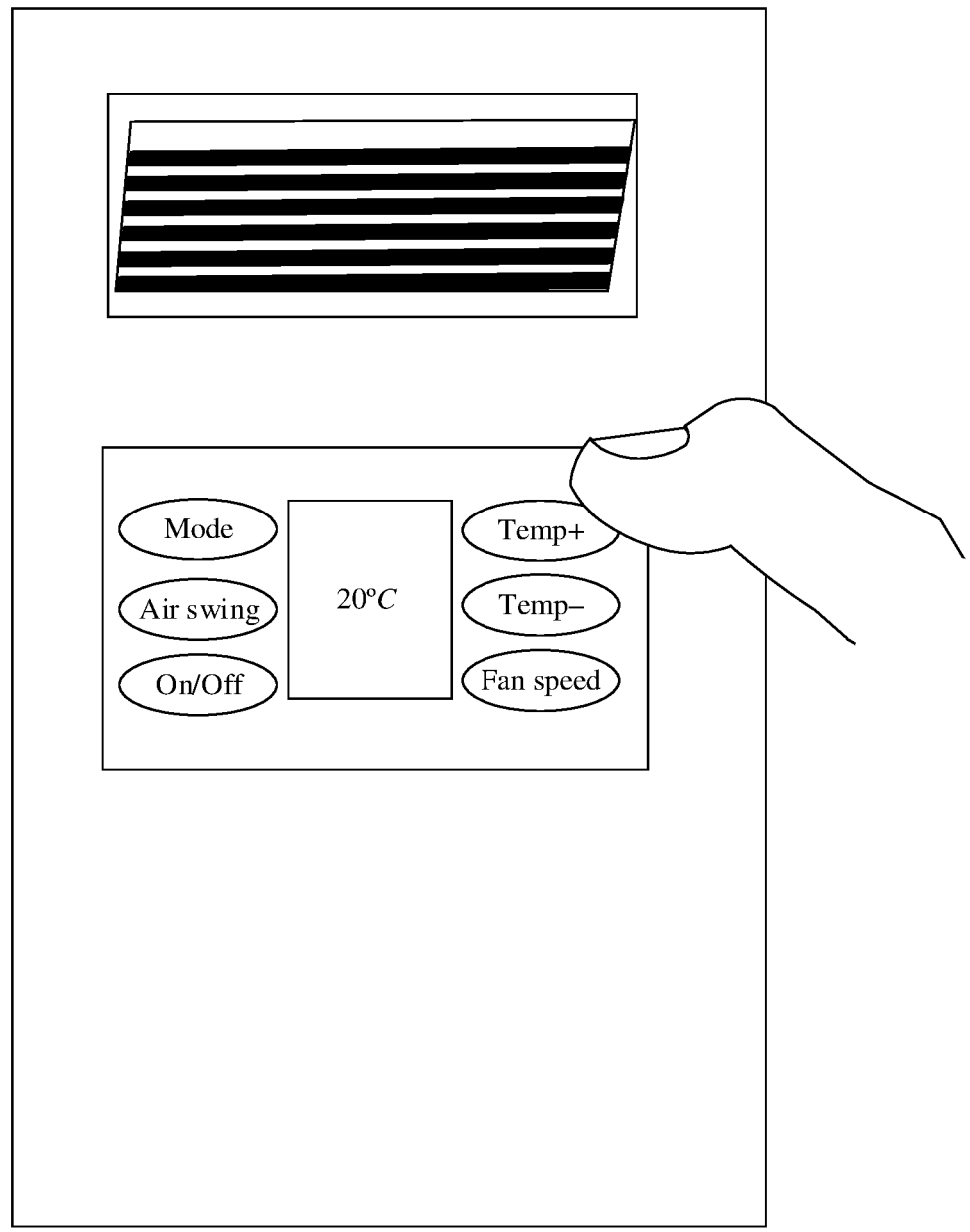
FIG. 5 is a schematic diagram of directly controlling a home device by a user according to an embodiment.

Optionally, in this embodiment, when the user directly performs an operation on the home device, the home device may send the operation information to the server. It should be noted that, that the user directly performs an operation on the home device means that the user controls the home device not by using a smart home APP. For example, that the user directly performs an operation on the home device may be that the user controls the home device by pressing keys on the home device. For example, assuming that the home device is an air conditioner shown in FIG. 5, after the user presses a "temperature+" button on the air conditioner, the home device sends operation information to the server. Content of the operation information may include, for example, "the user increases a specified temperature, and a current specified temperature is 21 degrees (that pressing "temperature+" once means correspondingly increasing one degree is used as an example). Alternatively, for example, assuming that the home device is a rice cooker, after the user presses a function key to adjust a mode to "cooking rice" for 30 minutes, the home device sends operation information to the server. Content of the operation information may include, for example, "the mode set by the user is 'cooking rice' for 30 minutes, and start time of the mode is 12:00". After receiving the operation information, the server may determine a target account by using the following steps S402 to S404. The target account is one of accounts associated with the home device.

It should be noted that after receiving the operation information, the server can immediately determine the target account. For example, after receiving the operation information sent by the air conditioner shown in FIG. 5, the server immediately determines the target account to which status information of the air conditioner needs to be pushed. Alternatively, the server may determine the target account at a specific time point after receiving the operation information, where the specific time point may be determined based on the content of the operation information. For example, after receiving the operation information sent by the rice cooker, the server may determine the specific time point to be 12:30.

Optionally, in this embodiment, when the user directly performs operations on the home device for a plurality of consecutive times (where a time interval between a current operation and a previous operation does not exceed a preset time), the home device may send operation information to the server only once. The operation information includes information about the home device after the last operation in the current round of consecutive operations of the user. For example, when the user presses the "temperature+" button on an air conditioner panel shown in FIG. 5 for three consecutive times (where a time interval between a current operation and a previous operation does not exceed a preset time), the air conditioner sends operation information to the server only once. Content of the operation information may include, for example, "the user increases a specified temperature, and a current specified temperature is 23 degrees (that pressing "temperature+" once means correspondingly increasing one degree is used as an example). When the user performs operations on the home device for a plurality of consecutive times, the home device needs to send operation information to the server only once, and therefore power consumption of the home device can be reduced. Correspondingly, the server needs to receive the operation information only once, and therefore power consumption of the server is also reduced.

S402: The server obtains GPS location information of one or more terminal devices.

The one or more terminal devices are logged in by the accounts associated with the home device. It should be noted that, in this embodiment, when an account associated with the home device is logged in on a terminal device, it is considered that a status of the account is an online state. A unified description is provided herein, and is not repeated in the following embodiments.

Optionally, in this embodiment, the server may obtain the GPS location information of the one or more terminal devices in the following manner:

The server sends a GPS location information query message to the one or more terminal devices, and correspondingly the one or more terminal devices receive the GPS location query message from the server. The one or more terminal devices each send GPS location information to the server, and correspondingly the server receives the GPS location information from the one or more terminal devices. Certainly, the server may alternatively obtain the GPS location information of the one or more terminal devices in another manner. This is not limited in this embodiment.

It should be noted that the one or more terminal devices include the foregoing target terminal device. For example, when there is only one terminal device, the terminal device and the target terminal device are a same terminal device. When there are a plurality of terminal devices, the target terminal device may be any one of the plurality of terminal devices.

S403: The server obtains GPS location information of the home device.

When the home device is installed for the first time or a network environment changes, for example, when a home wireless fidelity (Wi-Fi) network changes because of relocation, network access and registration operations of the home device are triggered. Network access and registration of the home device need to be completed by logging in to an account associated with the home device, on a smart home APP running on a terminal device, and the terminal device and the home device need to be located in a same network. Therefore, when the home device performs network access and registration, locations of the terminal device and the home device are close to each other. In this case, it may be considered that GPS location information that is of the terminal device and that is present when the home device performs network access is the GPS location information of the home device. The terminal device may obtain the GPS location information of the terminal device, and send the GPS location information of the terminal device as the GPS location information of the home device to the server.

Based on this, the server may obtain the GPS location information of the home device in the following manner:

The server receives network access GPS location information, where the network access GPS location information is GPS location information that is of a network access terminal device and that is present when the home device performs network access by using the network access terminal device, and the network access terminal device is a terminal device on which the account used by the home device to perform network access is logged in; and the server determines the network access GPS location information as the GPS location information of the home device.

Optionally, in this embodiment, each time the network environment changes, the terminal device may send, to the server, GPS location information that is of the home device and that is present after network access and registration are re-performed. After receiving the GPS location information, the server updates the GPS location information of the home device. Further, because all home devices in a house may be located in a same network, each time after the server receives the GPS location information of the home device, the server may use the GPS location information as GPS location information of all the home devices in the house. This avoids that the server separately obtains GPS location information of the home devices in the house, thereby reducing power consumption of the server.

The network herein may be a wireless network such as a Wi-Fi network, or may be a network in another form. This is not limited in this embodiment.

S404: The server determines, as the target account, an account corresponding to GPS location information that is in the GPS location information of the one or more terminal devices and that is closest to the GPS location of the home device.

Optionally, in this embodiment, the server may compare the GPS location information of the one or more terminal devices with the GPS location information of the home device to determine the GPS location information that is in the GPS location information of the one or more terminal devices and that is closest to the GPS location of the home device, and determine, as the target account, the account corresponding to the GPS location information closest to the GPS location of the home device.

S405: The server sends a notification message to the target terminal device. Correspondingly, the target terminal device receives the notification message from the server.

Figure 6:
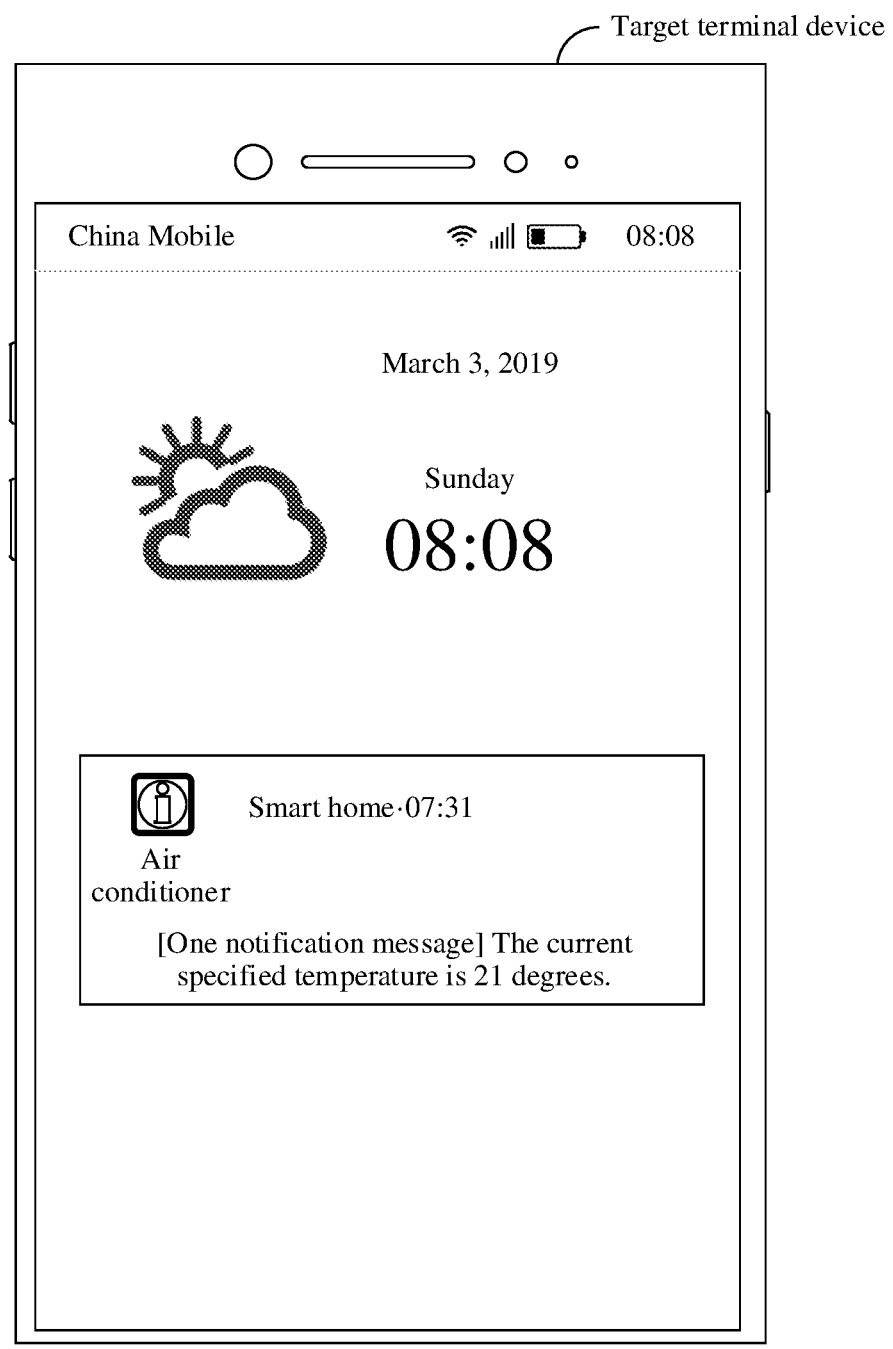
FIG. 6 is a schematic diagram of displaying a notification message according to an embodiment.

As described above, in this embodiment, that the terminal device on which the target account is logged in is the target terminal device is used as an example for description. The notification message includes status information used to indicate a status of the home device, and the status information of the home device is related to the operation information. For example, the user currently controls the air conditioner shown in FIG. 5. The status information of the home device may be "a current specified temperature is 21 degrees", and an interface displayed after the target terminal device receives the notification message may be shown in FIG. 6. Alternatively, for example, the user currently controls a rice cooker. The status information of the home device may be "rice cooking ends at 12:30".

Optionally, in this embodiment, after determining the target account, the server can immediately send the notification message to the target terminal device on which the target account is logged in.

Optionally, in this embodiment, after receiving the notification message from the server, the target terminal device may determine the status of the home device based on the notification message, to perform a subsequent operation. For example, the notification message received by the target terminal device includes "rice cooking ends at 12:30". The target terminal device may determine whether current time is later than 12:30. If the current time is later than 12:30 (for example, the current time is 12:31), the target terminal device may notify, in a vibration or ringing manner, the user that rice cooking has ended. Alternatively, the target terminal device may control, by using the target account logged in on the target terminal device, the rice cooker to be powered off or enter a heat preservation mode.

It should be noted that, in this embodiment, there is no definite sequence between step S401 and step S403. Step S401 may be performed before step S403, step S403 may be performed before step S401, or step S401 and step S403 may be performed simultaneously. This is not limited in this embodiment.

In the communications method provided in this embodiment, the home device sends the operation information to the server, where the operation information is used to indicate the operation performed by the user on the home device. After receiving the operation information from the home device, the server determines, as the target account based on the GPS location information of the one or more online accounts and the GPS location information of the home device, the account corresponding to the GPS location information closest to the GPS location of the home device, and sends the notification message to the target terminal device on which the account is logged in. The notification message includes the status information used to indicate the status of the home device. In this embodiment, when the user controls the home device, the server can determine the target account, and send the notification message including the status information of the home device to the terminal device on which the target account is logged in. This prevents unwanted information from being received by an account other than the target account, thereby enhancing user experience.

Figure 7:
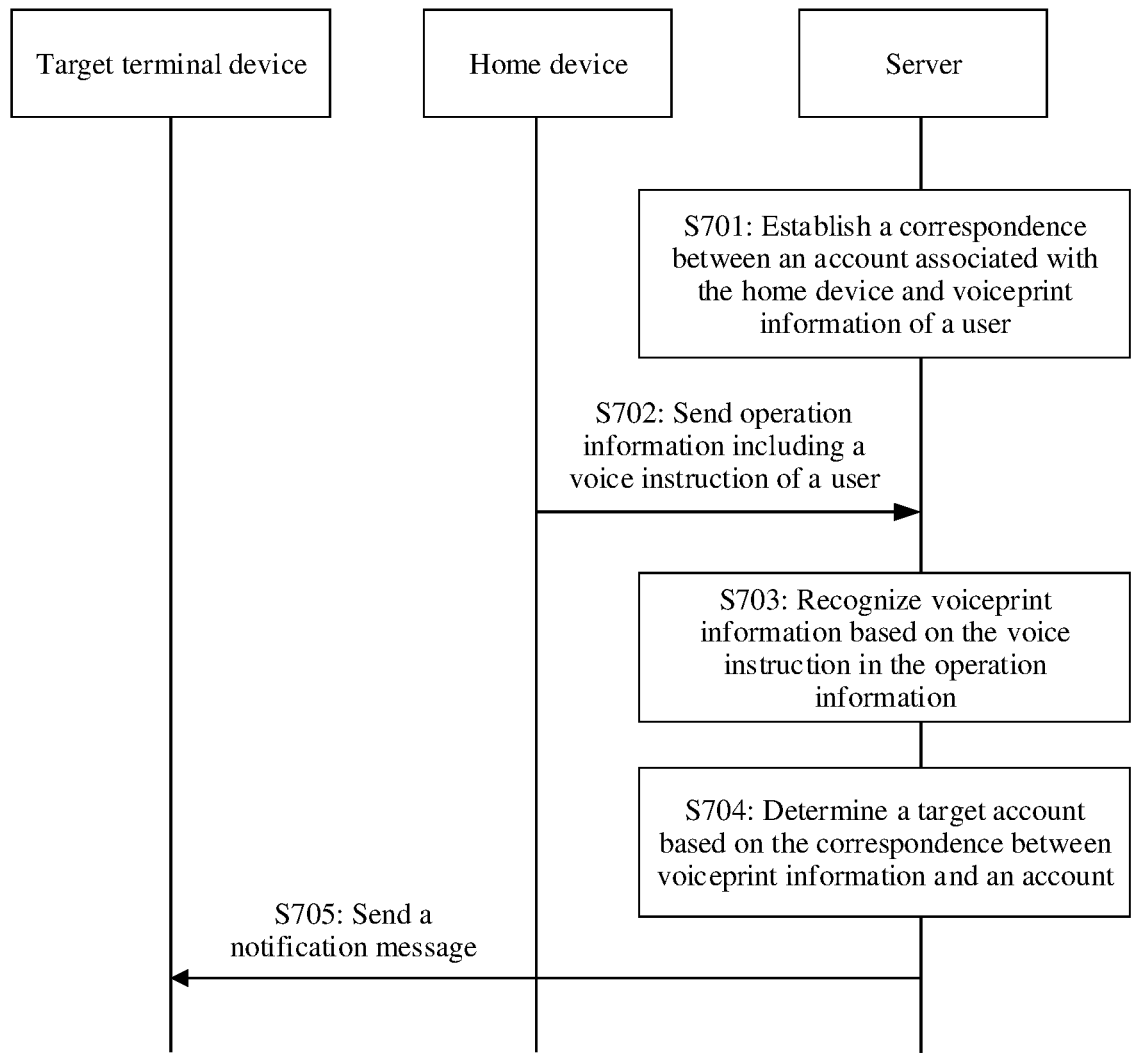
FIG. 7 is a schematic flowchart of another communications method according to an embodiment.

In another possible implementation, as shown in FIG. 7, a communications method provided in the embodiments includes the following steps.

S701: A server establishes a correspondence between an account associated with a home device and voiceprint information of a user.

Optionally, in this embodiment, the user may be a user who uses the home device, for example, all family members in a family.

Optionally, in this embodiment, the server may establish the correspondence between an account associated with the home device and voiceprint information of a user in the following manner:

The server receives information that is about an account associated with the home device and that comes from one or more terminal devices and voice information of a user associated with the account. The one or more terminal devices are terminal devices on which the accounts associated with the home device are logged in. It should be noted that the one or more terminal devices include the foregoing target terminal device. For example, when there is only one terminal device, the terminal device and the target terminal device are a same terminal device. When there are a plurality of terminal devices, the target terminal device may be any one of the plurality of terminal devices.

The server performs voiceprint recognition on the voice information of the user associated with the accounts associated with the home device, and determines voiceprint information of the user associated with the accounts associated with the home device, where the voice information of the user may be a segment of voice. The server may recognize the voiceprint information based on the voice. The voiceprint information may include information such as a timbre.

The server establishes the correspondence between an account associated with the home device and voiceprint information of a user. For example, the correspondence, established by the server, between an account associated with the home device and voiceprint information of a user may be listed in Table 1.

Optionally, in this embodiment, when an account associated with the home device is registered, the one or more terminal devices may prompt a user associated with the account to input voice information and send information about the account and the voice information of the user to the server. Alternatively, after an account associated with the home device is logged in, the one or more terminal devices may prompt a user associated with the account to input voice information, and send information about the account and the voice information of the user to the server. Alternatively, the one or more terminal devices may send an account associated with the home device and voice information of a user associated with the account to the server at another moment. This is not limited in this embodiment.

TABLE 1

| Information about an account | Voiceprint information of a user associated with the account |
|---|---|
| Account 1 | Voiceprint 1 |
| Account 2 | Voiceprint 2 |
| Account 3 | Voiceprint 3 |
| Account 4 | Voiceprint 4 |

S702: The home device sends operation information to the server, where the operation information includes a voice instruction of a user who currently controls the home device. Correspondingly, the server receives the operation information from the home device.

The operation information is used to indicate an operation performed by the user on the home device.

Figure 8:
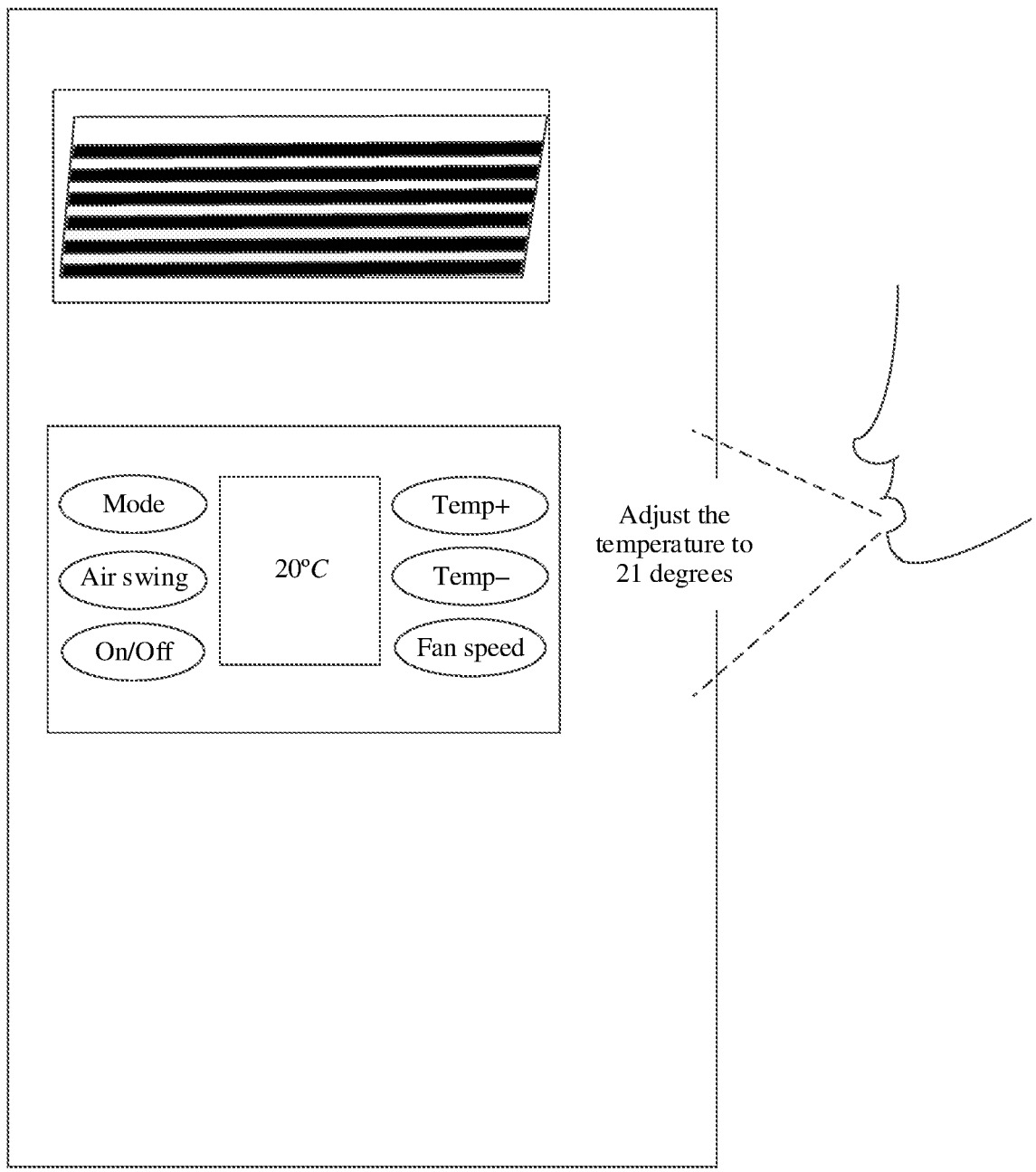
FIG. 8 is another schematic diagram of directly controlling a home device by a user according to an embodiment.

Optionally, in this embodiment, for the home device having a voice recognition capability, the user may perform voice control on the home device. After receiving the voice instruction of the user, the home device may send the operation information to the server, where the operation information may include the voice instruction of the user. For example, it is assumed that an air conditioner shown in FIG. 8 has a voice recognition capability, and a user may perform voice control on the air conditioner. For example, the user sends a voice instruction "adjusting a temperature to 21 degrees" to the home device, and the home device sends operation information to the server after receiving the voice instruction. Content of the operation information may include, for example, "the voice instruction of the user is: adjusting the temperature to 21 degrees; and a current status is: the specified temperature is 21 degrees". Alternatively, for example, it is assumed that the home device is a rice cooker. A user may send a voice instruction "setting a mode to 'cooking rice' for 30 minutes" to the home device, and the home device sends operation information to the server after receiving the voice instruction. Content of the operation information may include, for example, "the voice instruction of the user is: adjusting the mode to 'cooking rice' for 30 minutes; and start time of the mode is 12:00". After receiving the operation information, the server may determine a target account by using the following steps S703 and S704. The target account is one of accounts associated with the home device.

S703: The server recognizes voiceprint information of the user based on the voice instruction of the user in the operation information.

After receiving the operation information, the server may recognize the voiceprint information of the user based on the voice instruction of the user included in the operation information.

S704: The server determines the target account based on the correspondence between voiceprint information and an account of a user.

The server may determine, based on the pre-established correspondence between voiceprint information and an account, an account corresponding to voiceprint information that best matches the voiceprint information of the user as the target account.

S705: The server sends a notification message to the target terminal device. Correspondingly, the target terminal device receives the notification message from the server.

As described above, in this embodiment, that the terminal device on which the target account is logged in is the target terminal device is used as an example for description. The notification message includes status information used to indicate a status of the home device, and the status of the home device is related to the operation information. For example, the user currently controls the air conditioner shown in FIG. 8. The status information of the home device may be "a current specified temperature is 21 degrees", and an interface displayed after the target terminal device receives the notification message may be shown in FIG. 6. Alternatively, for example, the user currently controls a rice cooker. The status information of the home device may be "rice cooking ends at 12:30".

Optionally, in this embodiment, after determining the target account, the server can immediately send the notification message to the target terminal device on which the target account is logged in.

Optionally, in this embodiment, after receiving the notification message from the server, the target terminal device may determine the status of the home device based on the notification message, to perform a subsequent operation. For example, the notification message received by the target terminal device includes "rice cooking ends at 12:30". The target terminal device may determine whether current time is later than 12:30. If the current time is later than 12:30 (for example, the current time is 12:31), the target terminal device may notify, in a vibration or ringing manner, the user that rice cooking has ended. Alternatively, the target terminal device may control, by using the target account logged in on the target terminal device, the rice cooker to be powered off or enter a heat preservation mode.

It should be noted that, in this embodiment, there is no definite sequence between step S701 and step S702. Step S701 may be performed before step S702, step S702 may be performed before step S701, or step S701 and step S702 may be performed simultaneously. This is not limited in this embodiment.

In the communications method provided in this embodiment, the home device sends the operation information to the server, where the operation information is used to indicate the operation performed by the user on the home device. After receiving the operation information from the home device, the server determines, as the target account based on the correspondence between voiceprint information of a user and an account of the user, an account corresponding to voiceprint information that best matches the voiceprint information recognized based on the voice instruction of the user, and sends the notification message to the target terminal device on which the target account is logged in. The notification message includes the status information used to indicate the status of the home device.

In this embodiment, when the user controls the home device, the server can determine the target account, and send the notification message including the status information of the home device to the terminal device on which the target account is logged in. This prevents unwanted information from being received by an account other than the target account, thereby enhancing user experience.

Figure 9:
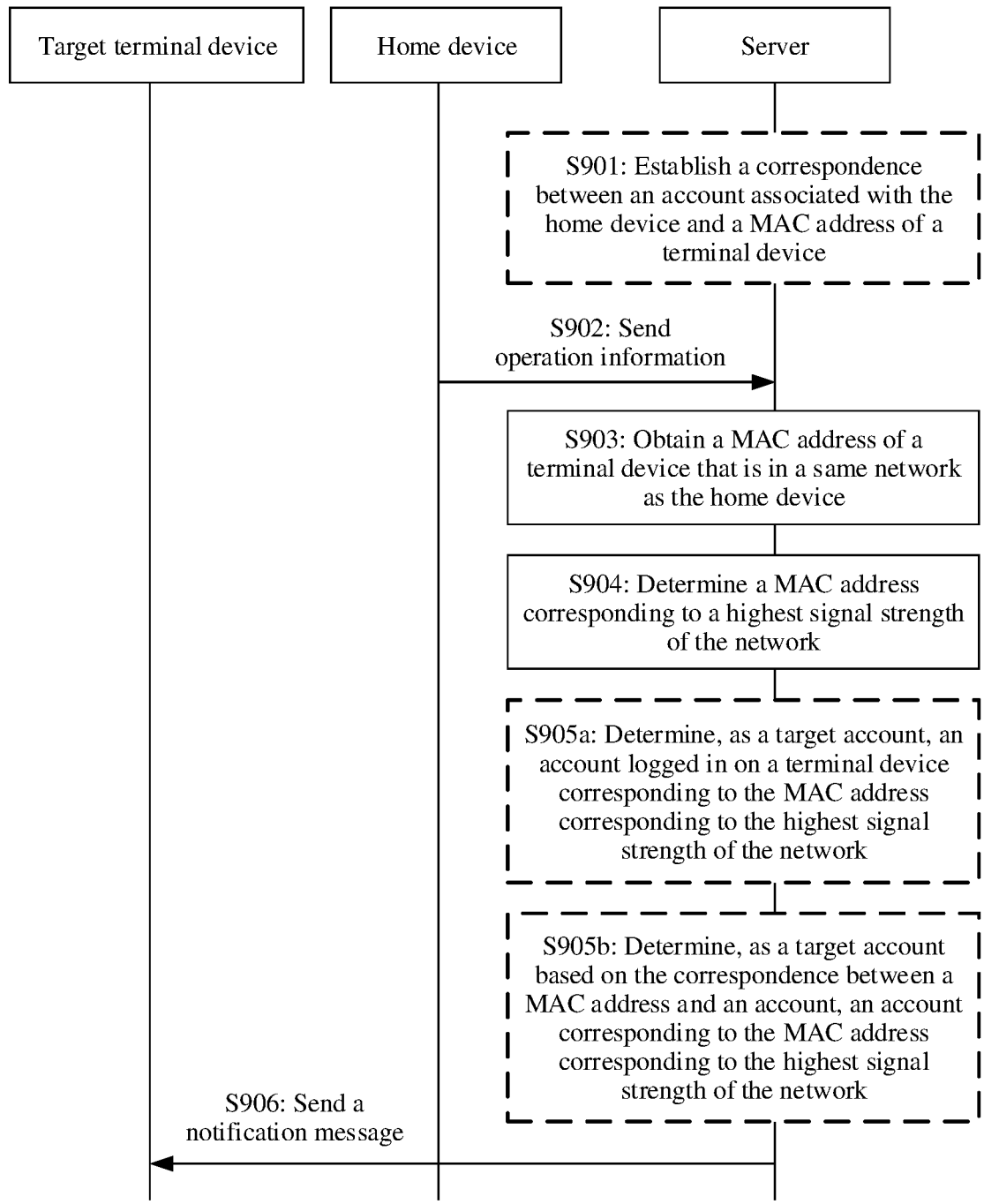
FIG. 9 is a schematic flowchart of still another communications method according to an embodiment.

In still another possible implementation, as shown in FIG. 9, a communications method provided in the embodiments includes the following steps.

S901: A server establishes a correspondence between an account associated with a home device and a MAC address of a terminal device.

The terminal device is a terminal device on which the accounts associated with the home device are logged in.

It should be noted that step S901 is an optional step, and the server may not perform step S901.

Optionally, in this embodiment, the server may establish the correspondence between an account associated with the home device and a MAC address of a terminal device in the following manner:

The server receives a MAC address from each of one or more terminal devices and an account corresponding to the MAC address of the terminal device. It should be noted that the account corresponding to the MAC address of the terminal device can be understood as an account registered with or logged in on the terminal device. The one or more terminal devices include the foregoing target terminal device. For example, when there is only one terminal device, the terminal device and the target terminal device are a same terminal device. When there are a plurality of terminal devices, the target terminal device may be any one of the plurality of terminal devices.

The server establishes the correspondence between an account associated with the home device and a MAC address of a terminal device. For example, the correspondence, established by the server, between an account associated with the home device and a MAC address of a terminal device may be listed in Table 2.

Optionally, in this embodiment, when an account associated with the home device is registered, the one or more terminal devices may send information about the account and a MAC address of the terminal device to the server. Alternatively, after an account associated with the home device is logged in, the one or more terminal devices may send information about the account and a MAC address of the terminal device to the server. Alternatively, the one or more terminal devices may send an account associated with the home device and a MAC address of the terminal device to the server at another moment. This is not limited in this embodiment.

TABLE 2

| Information about an account | MAC address of a terminal device |
| --- | --- |
| Account 1 | MAC 1 |
| Account 2 | MAC 2 |
| Account 3 | MAC 3 |
| Account 4 | MAC 4 |

S902: The home device sends operation information to the server. Correspondingly, the server receives the operation information from the home device.

The operation information is used to indicate an operation performed by a user on the home device.

In this embodiment, when the user directly performs an operation on the home device, the home device may send the operation information to the server. For a specific manner thereof, refer to step S401. For a specific manner of the home device having a voice recognition capability, refer to step S702. Details are not described herein again. After receiving the operation information, the server may determine, by using the following steps S903 to S905a or S903 to S905b, an account of the user who currently controls the home device.

S903: The server obtains a MAC address of the one or more terminal devices.

The one or more terminal devices are terminal devices on which accounts associated with the home device are logged in, and the one or more terminal devices and the home device are located in a same network.

Optionally, in this embodiment, the server may obtain the MAC address of the one or more terminal devices in the following three manners.

Manner 1 includes the following steps.

a. The server receives, from the home device, a sorting result of the MAC address of the one or more devices that are in the same network as the home device. Correspondingly, the server receives the sorting result of the MAC address.

The sorting result of the MAC address is obtained based on a signal strength of the network corresponding to a MAC address of each of the one or more devices.

Optionally, in this embodiment, the home device may listen on a network air interface, obtain the MAC address of the device that is in the same network (for example, with a same network identifier) as the home device, sort the obtained MAC address based on the signal strength of the corresponding network, and send the sorting result of the MAC address to the server.

It should be noted that, in this embodiment, the one or more devices that are in the same network as the home device may include a device having a network connection function, for example, a terminal device (a mobile phone and a tablet computer of family members in a family at a current moment) and other home devices. The network may be a wireless network such as a home Wi-Fi network, or may be a network of another type. This is not limited in this embodiment.

For example, the home device is located in a network 1. MAC address information of the one or more devices that are in the same network 1 as the home device and a signal strength of the network 1 corresponding to each of the one or more devices may be listed in Table 3. It can be understood from Table 3 that there are four devices in the same network 1 as the home device. A result obtained after the home device sorts MAC addresses of the four devices based on the signal strength of the network 1 corresponding to a MAC address of each device is listed in Table 3.

TABLE 3

| Network identifier | Device | MAC address information | Network signal strength |
|---|---|---|---|
| Network 1 | Device 1 | MAC 1 | 3 |
| Network 1 | Device 2 | MAC 2 | 1 |
| Network 1 | Device 3 | MAC 3 | 2 |
| Network 1 | Device 4 | MAC 4 | 4 |

TABLE 4

| Sorting result | Device | MAC address information | Network signal strength |
|---|---|---|---|
| 1 | Device 4 | MAC 4 | 4 |
| 2 | Device 1 | MAC 1 | 3 |
| 3 | Device 3 | MAC 3 | 2 |
| 4 | Device 2 | MAC 2 | 1 | b. The server obtains the MAC address of the one or more terminal devices from the sorting result of the MAC address reported by the home device.

The one or more terminal devices are the terminal devices on which the accounts associated with the home device are logged in, and the one or more terminal devices include the target terminal device.

The server may obtain the MAC address of the terminal device on which the accounts associated with the home device are logged in and an account logged in on the terminal device, and then compare a MAC address of the terminal device on which the account is logged in with the sorting result of the MAC address reported by the home device. In this way, the MAC address of the one or more terminal devices can be determined. For example, the sorting result of the MAC address reported by the home device includes the content listed in Table 4. The MAC address of the one or more terminal devices obtained by the server may be listed in Table 5.

TABLE 5

| Sorting result | Device | Account logged in on the device | MAC address information | Network signal strength |
|---|---|---|---|---|
| 2 | Device 1 | Account 1 | MAC 1 | 3 |
| 4 | Device 2 | Account 2 | MAC 2 | 1 |

Manner 2 includes the following steps.

a. The server receives, from the home device, the MAC address of the one or more devices that are in the same network as the home device and a signal strength of the network corresponding to a MAC address of each of the one or more devices.

For related description of the MAC address of the one or more devices that are in the same network as the home device and the signal strength of the network corresponding to the MAC address of each of the one or more devices, refer to the foregoing Manner 1. Details are not described herein again.

Optionally, in this embodiment, the home device may listen on a network air interface, obtain the MAC address of the device that is in the same network (for example, with a same network identifier) as the home device and the signal strength of the network corresponding to each MAC address, and send the obtained MAC address and the signal strength of the network corresponding to each MAC address to the server.

b. The server sorts, based on the signal strength of the network corresponding to the MAC address of each device, the obtained MAC address and the signal strength of the network corresponding to the obtained MAC address. For example, the foregoing content obtained by the server is the content listed in Table 3. A result obtained after the server performs sorting may be listed in Table 4. Details are not described herein again.

c. After obtaining the sorting result, the server obtains, based on the sorting result, the MAC address of the one or more terminal devices and the signal strength of the network corresponding to the MAC address of each terminal device of the one or more terminal devices. For related description thereof, refer to step b in the foregoing Manner 1. Details are not described herein again.

Manner 3 includes the following steps.

a. The server sends a MAC address related information query message to one or more first terminal devices.

The one or more first terminal devices are the terminal devices on which the accounts associated with the home device are logged in, the one or more first terminal devices may be located in different networks, and the one or more first terminal devices include the target terminal device.

b. The server receives MAC address related information from the one or more first terminal devices.

The MAC address related information may include: a MAC address of the first terminal device, an identifier of a network corresponding to the MAC address of the first terminal device, and a signal strength of the network corresponding to the MAC address of the first terminal device.

c. The server obtains, from the MAC address related information of the one or more first terminal devices, the MAC address of the one or more terminal devices that are in the same network as the home device and a signal strength of a network corresponding to a MAC address of each terminal device of the one or more terminal devices.

Before step c is performed, the server may obtain an identifier of the network in which the home device is located.

For example, content of the MAC address related information of the one or more first terminal devices received by the server may be listed in Table 6. A terminal device corresponding to a MAC 1 and a terminal device corresponding to a MAC 2 are located in a same network 1, a terminal device corresponding to a MAC 3 is located in a network 2, and a terminal device corresponding to a MAC 4 is located in a network 3. If the identifier, obtained by the server, of the network in which the home device is located is 1, MAC addresses that are of terminal devices in the same network as the home device and that are obtained by the server are the MAC 1 and the MAC 2, and correspondingly signal strengths of the network 1 are 2 and 1.

TABLE 6

| Network identifier | MAC address of a terminal device | Account logged in on the terminal device | Network signal strength |
|---|---|---|---|
| Network 1 | MAC 1 | Account 1 | 3 |
| Network 1 | MAC 2 | Account 2 | 1 |
| Network 2 | MAC 3 | Account 3 | 4 |
| Network 3 | MAC 4 | Account 4 | 3 | d. The server sorts the MAC address of the one or more terminal devices based on the signal strength of the network.

For example, the MAC address related information obtained by the server includes the content listed in Table 6. A result obtained after the server sorts the MAC address of the one or more terminal devices based on the signal strength of the network is listed in Table 7.

TABLE 7

| Sorting result | Network identifier | MAC address of a terminal device | Account logged in on the terminal device | Network signal strength |
|---|---|---|---|---|
| 1 | Network 1 | MAC 1 | Account 1 | 3 |
| 2 | Network 1 | MAC 2 | Account 2 | 1 |

S904: The server determines a MAC address corresponding to a highest signal strength of the network in the MAC address of the one or more terminal devices.

The server may determine, based on the sorting result obtained in any one of the foregoing three manners in step S903, the MAC address corresponding to the highest signal strength of the network in the MAC address of the one or more terminal devices. For example, the MAC address that is corresponding to the highest signal strength of the network and that is determined by the server may be the MAC 1.

S905a: The server determines, as the target account, an account logged in on a terminal device corresponding to the MAC address corresponding to the highest signal strength of the network.

Optionally, if the server does not perform step S901, the server may perform step S905a, to determine, as the target account, the account logged in on the terminal device corresponding to the MAC address corresponding to the highest signal strength of the network. For example, the target account determined by the server may be the account 1 logged in on the terminal device corresponding to the MAC 1.

S905b: The server determines, as the target account based on the correspondence between a MAC address and an account, an account corresponding to the MAC address corresponding to the highest signal strength of the network.

Optionally, if the server performs step S901, the server may perform step S905b, to determine, as the target account based on the correspondence between a MAC address and an account, the account corresponding to the MAC address corresponding to the highest signal strength of the network.

It should be noted that, when the server performs step S901, the server may determine the target account in the manner in step S905a. This is not limited in this embodiment.

S906: The server sends a notification message to the target terminal device. Correspondingly, the target terminal device receives the notification message from the server.

As described above, in this embodiment, that the terminal device on which the target account is logged in is the target terminal device is used as an example for description. The notification message includes status information used to indicate a status of the home device, and the status of the home device is related to the operation information. For example, the user currently controls the air conditioner shown in FIG. 8. The status information of the home device may be "a current specified temperature is 21 degrees", and an interface displayed after the first terminal device receives the notification message may be shown in FIG. 6. Alternatively, for example, the user currently controls a rice cooker. The status information of the home device may be "rice cooking ends at 12:30".

Optionally, in this embodiment, after receiving the notification message from the server, the target terminal device may determine the status of the home device based on the notification message, to perform a subsequent operation. For example, the notification message received by the target terminal device includes "rice cooking ends at 12:30". The target terminal device may determine whether current time is later than 12:30. If the current time is later than 12:30 (for example, the current time is 12:31), the target terminal device may notify, in a vibration or ringing manner, the user that rice cooking has ended. Alternatively, the target terminal device may control, by using the target account logged in on the target terminal device, the rice cooker to be powered off or enter a heat preservation mode.

In the communications method provided in this embodiment, the home device sends the operation information to the server, where the operation information is used to indicate the operation performed by the user on the home device. After receiving the operation information from the home device, the server determines the MAC address corresponding to the highest signal strength of the network in the MAC address of the one or more terminal devices that are in the same network as the home device; determines, as the target account, the account logged in on the terminal device corresponding to the MAC address corresponding to the highest signal strength of the network, or determines, as the target account based on the correspondence between a MAC address and an account, the account corresponding to the MAC address corresponding to the strongest network signal; and sends the notification message to the target terminal device on which the target account is logged in, where the notification message includes the status information used to indicate the status of the home device. In this embodiment, when the user controls the home device, the server can determine the target account, and send the notification message including the status information of the home device to the terminal device on which the target account is logged in. This prevents unwanted information from being received by an account other than the target account, thereby enhancing user experience.

It can be understood that, in the foregoing embodiments, the methods and/or steps implemented by the first terminal device may alternatively be implemented by a component (for example, a chip or a circuit) that can be used for the first terminal device, the methods and/or steps implemented by the home device may alternatively be implemented by a component (for example, a chip or a circuit) that can be used for the home device, and the methods and/or steps implemented by the server may alternatively be implemented by a component (for example, a chip or a circuit) that can be used for the server.

The foregoing mainly describes the solutions provided in the embodiments from a perspective of interaction between various network elements. Correspondingly, an embodiment further provides a communications apparatus. The communications apparatus is configured to implement the foregoing methods. The communications apparatus may be the first terminal device in the foregoing method embodiments, an apparatus including the first terminal device, or a component that can be used for the first terminal device. Alternatively, the communications apparatus may be the home device in the foregoing method embodiments, an apparatus including the home device, or a component that can be used for the home device. Alternatively, the communications apparatus may be the server in the foregoing method embodiments, an apparatus including the server, or a component that can be used for the server. It can be understood that, to implement the foregoing functions, the communications apparatus includes a corresponding hardware structure and/or software module for performing the functions. A person of ordinary skill in the art should easily be aware that, in combination with units and algorithm steps of the examples described in the embodiments, this application may be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope.

In the embodiments, functional modules of the communications apparatus may be obtained through division based on the foregoing method embodiments. For example, each functional module may be obtained through division in correspondence to each function, or at least two functions may be integrated into one processing module. The integrated module may be implemented in a form of hardware, or may be implemented in a form of a software functional module. It should be noted that, in the embodiments, module division is used as an example, and is merely a logical function division. In an actual implementation, another division manner may be used.

Figure 10:
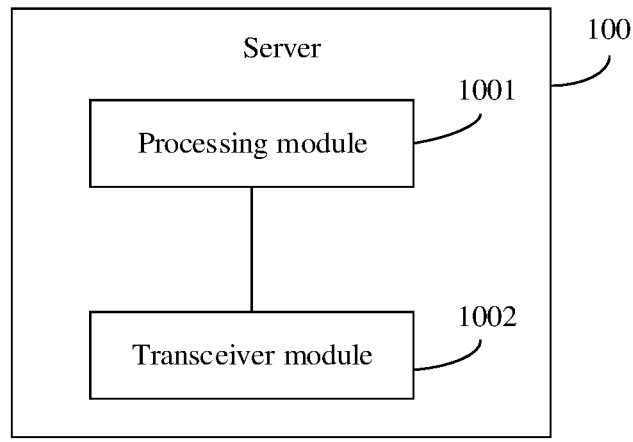
FIG. 10 is a schematic structural diagram of a server according to an embodiment.

For example, the communications apparatus is the server in the foregoing method embodiments. FIG. 10 is a schematic structural diagram of a server 100. The server 100 includes a processing module 1001 and a transceiver module 1002. The transceiver module 1002 may also be referred to as a transceiver unit, configured to implement a sending and/or receiving function. For example, the transceiver module 1002 may be a transceiver circuit, a transceiver, or a communications interface.

The processing module 1001 is configured to receive operation information from a home device by using the transceiver module 1002, where the operation information is used to indicate an operation performed by a user on the home device; the processing module 1001 is further configured to determine a target account, where the target account is one of accounts associated with the home device; and the processing module 1001 is further configured to send a notification message to a target terminal device by using the transceiver module 1002, where the notification message includes status information used to indicate a status of the home device, the status of the home device is related to the operation information, and the target terminal device is a terminal device on which the target account is logged in.

Optionally, that the processing module 1001 is configured to determine a target account includes: the processing module 1001 is configured to obtain GPS location information of one or more terminal devices, where the one or more terminal devices are logged in by the accounts associated with the home device; the processing module 1001 is further configured to determine GPS location information that is in the GPS location information of the one or more terminal devices and that is closest to a GPS location of the home device; and the processing module 1001 is further configured to determine, as the target account, an account logged in on a terminal device corresponding to the GPS location information closest to the GPS location of the home device.

Optionally, the processing module 1001 is further configured to receive network access GPS location information by using the transceiver module 1002, where the network access GPS location information is GPS location information that is of a network access terminal device and that is present when the home device performs network access by using the network access terminal device; and the processing module 1001 is further configured to determine the network access GPS location information as the GPS location information of the home device.

Optionally, the operation information includes a voice instruction of the user. That the processing module 1001 is configured to determine a target account includes: the processing module 1001 is configured to recognize voiceprint information of the user based on the voice instruction of the user; and the processing module 1001 is further configured to determine, based on a pre-established correspondence between voiceprint information and an account, an account corresponding to voiceprint information that best matches the voiceprint information of the user as the target account.

Optionally, that the processing module 1001 is configured to determine a target account includes: the processing module 1001 is configured to obtain a MAC address of one or more terminal devices and a signal strength of a network corresponding to a MAC address of each terminal device of the one or more terminal devices, where the one or more terminal devices are logged in by the accounts associated with the home device, and the one or more terminal devices and the home device are located in the same network; the processing module 1001 is further configured to determine a MAC address corresponding to a highest signal strength of the network in the MAC address of the one or more terminal devices; and the processing module 1001 is further configured to determine, as the target account, an account logged in on a terminal device corresponding to the MAC address corresponding to the highest signal strength of the network.

In this embodiment, that the processing module 1001 is configured to send the foregoing information or message by using the transceiver module 1002 can be understood as follows: The processing module 1001 is configured to generate, after obtaining the foregoing information or message, a signal that carries the foregoing information or message, and the transceiver module 1002 may send a signal that has undergone signal processing or the signal without signal processing. Alternatively, in this embodiment, that the processing module 1001 is configured to receive the foregoing information or message by using the transceiver module 1002 can be understood as follows: After receiving a signal that carries the foregoing information or message and that is sent by the outside, the transceiver module 1002 sends, to the processing module 1001 for processing, a signal that has undergone signal processing or the signal without signal processing. A unified description is provided herein, and is not repeated in the following.

All related content of various steps in the foregoing method embodiments may be cited in function description of a corresponding functional module. Details are not described herein again.

In this embodiment, the server 100 is presented with the functional modules obtained through division in an integrated manner. The "module" herein may be an ASIC, a circuit, a processor that executes one or more software or firmware programs, a memory, an integrated logic circuit, and/or another component capable of providing the foregoing functions. In a simple embodiment, a person of ordinary skill in the art can figure out that the form of the communications device 20 shown in FIG. 3 may be used for the server 100.

For example, the processor 201 in the communications device 20 shown in FIG. 3 may invoke the computer executable instructions stored in the memory 203, so that the server 100 performs the communications methods in the foregoing method embodiments.

For example, functions/implementation processes of the processing module 1001 and the transceiver module 1002 in FIG. 10 may be implemented by the processor 201 in the communications device 20 shown in FIG. 3 by invoking the computer executable instructions stored in the memory 203. Alternatively, a function/implementation process of the processing module 1001 in FIG. 10 may be implemented by the processor 201 in the communications device 20 shown in FIG. 3 by invoking the computer executable instructions stored in the memory 203; and a function/implementation process of the transceiver module 1002 in FIG. 10 may be implemented by the communications interface 204 in the communications device 20 shown in FIG. 3.

The server 100 provided in this embodiment may perform the communications methods. Therefore, for effects that can be achieved by the terminal device 100, refer to the foregoing method embodiments. Details are not described herein again.

Figure 11:
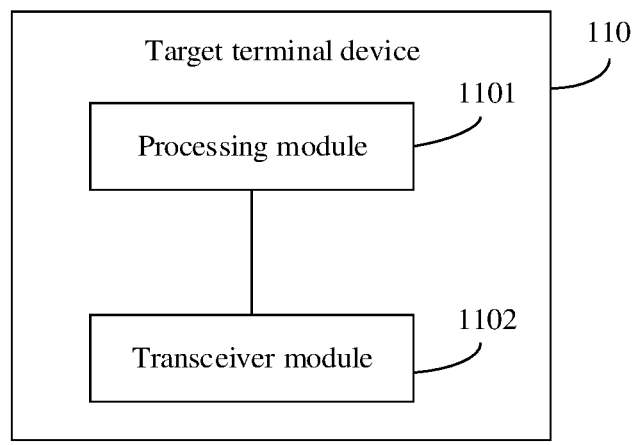
FIG. 11 is a schematic structural diagram of a target terminal device according to an embodiment.

Alternatively, for example, the communications apparatus is the terminal device in the foregoing method embodiments. FIG. 11 is a schematic structural diagram of a target terminal device 110. The target terminal device 110 includes a processing module 1101 and a transceiver module 1102. The transceiver module 1102 may also be referred to as a transceiver unit, configured to implement a sending and/or receiving function. For example, the transceiver module 1102 may be a transceiver circuit, a transceiver, or a communications interface.

The processing module 1101 is configured to receive a notification message from a server by using the transceiver module 1102, where the notification message includes status information used to indicate a status of a home device, the status of the home device is related to operation information, the operation information is sent by the home device to the server, and the operation information is used to indicate an operation performed by a user on the home device; and the processing module 1101 is further configured to determine the status of the home device based on the notification message.

The processing module 1101 is further configured to send first information to the server by using the transceiver module 1102, where the first information is used by the server to determine a target account, the target account is one of accounts associated with the home device, and the first information includes GPS location information of the terminal device, or includes a MAC address of the terminal device, an identifier of a network corresponding to the MAC address, and a signal strength of the network corresponding to the MAC address.

In this embodiment, that the processing module 1101 is configured to send the foregoing information or message by using the transceiver module 1102 can be understood as follows: The processing module 1101 is configured to generate, after obtaining the foregoing information or message, a signal that carries the foregoing information or message, and the transceiver module 1102 may send a signal that has undergone signal processing or the signal without signal processing. Alternatively, in this embodiment, that the processing module 1101 is configured to receive the foregoing information or message by using the transceiver module 1102 can be understood as follows: After receiving a signal that carries the foregoing information or message and that is sent by the outside, the transceiver module 1102 sends, to the processing module 1101 for processing, a signal that has undergone signal processing or the signal without signal processing. A unified description is provided herein, and is not repeated in the following.

All related content of various steps in the foregoing method embodiments may be cited in function description of a corresponding functional module. Details are not described herein again.

In this embodiment, the target terminal device 110 is presented with the functional modules obtained through division in an integrated manner. The "module" herein may be an ASIC, a circuit, a processor that executes one or more software or firmware programs, a memory, an integrated logic circuit, and/or another component capable of providing the foregoing functions. In a simple embodiment, a person of ordinary skill in the art can figure out that the form of the communications device 20 shown in FIG. 3 may be used for the target terminal device 110.

For example, the processor 201 in the communications device 20 shown in FIG. 3 may invoke the computer executable instructions stored in the memory 203, so that the target terminal device 110 performs the communications methods in the foregoing method embodiments.

For example, functions/implementation processes of the processing module 1101 and the transceiver module 1102 in FIG. 11 may be implemented by the processor 201 in the communications device 20 shown in FIG. 3 by invoking the computer executable instructions stored in the memory 203. Alternatively, a function/implementation process of the processing module 1101 in FIG. 11 may be implemented by the processor 201 in the communications device 20 shown in FIG. 3 by invoking the computer executable instructions stored in the memory 203; and a function/implementation process of the transceiver module 1102 in FIG. 11 may be implemented by the communications interface 204 in the communications device 20 shown in FIG. 3.

The target terminal device 110 provided in this embodiment may perform the communications methods. Therefore, for effects that can be achieved by the target terminal device 110, refer to the foregoing method embodiments. Details are not described herein again.

Figure 12:
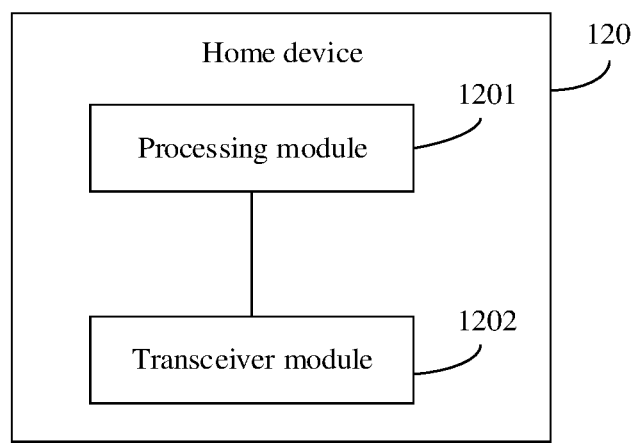
FIG. 12 is a schematic structural diagram of a home device according to an embodiment.

Alternatively, for example, the communications apparatus is the home device in the foregoing method embodiments. FIG. 12 is a schematic structural diagram of a home device 120. The home device 120 includes a processing module 1201 and a transceiver module 1202. The transceiver module 1202 may also be referred to as a transceiver unit, configured to implement a sending and/or receiving function. For example, the transceiver module 1202 may be a transceiver circuit, a transceiver, or a communications interface.

The processing module 1201 is configured to obtain MAC address related information of one or more devices having a network connection function that are in a same network as the home device, where the MAC address related information is used to determine a target account, the target account is one of accounts associated with the home device, and the one or more devices having a wireless connection function include a terminal device on which the accounts associated with the home device are logged in; and the processing module 1201 is further configured to send the MAC address related information to a server by using the transceiver module 1202.

The processing module 1201 is further configured to send operation information to the server by using the transceiver module 1202, where the operation information is used to indicate an operation performed by a user on the home device, a terminal device on which the target account is logged in is a target terminal device, the target terminal device is a terminal device receiving a notification message sent by the server, the notification message includes status information used to indicate a status of the home device, and the status of the home device is related to the operation information.

In this embodiment, that the processing module 1201 is configured to send the foregoing information or message by using the transceiver module 1202 can be understood as follows: The processing module 1201 is configured to generate, after obtaining the foregoing information or message, a signal that carries the foregoing information or message, and the transceiver module 1202 may send a signal that has undergone signal processing or the signal without signal processing. Alternatively, in this embodiment, that the processing module 1201 is configured to receive the foregoing information or message by using the transceiver module 1202 can be understood as follows: After receiving a signal that carries the foregoing information or message and that is sent by the outside, the transceiver module 1202 sends, to the processing module 1201 for processing, a signal that has undergone signal processing or the signal without signal processing. A unified description is provided herein, and is not repeated in the following.

All related content of various steps in the foregoing method embodiments may be cited in function description of a corresponding functional module. Details are not described herein again.

In this embodiment, the home device 120 is presented with the functional modules obtained through division in an integrated manner. The "module" herein may be an ASIC, a circuit, a processor that executes one or more software or firmware programs, a memory, an integrated logic circuit, and/or another component capable of providing the foregoing functions. In a simple embodiment, a person of ordinary skill in the art can figure out that the form of the communications device 20 shown in FIG. 3 may be used for the home device 120.

For example, the processor 201 in the communications device 20 shown in FIG. 3 may invoke the computer executable instructions stored in the memory 203, so that the home device 120 performs the communications methods in the foregoing method embodiments.

For example, functions/implementation processes of the processing module 1201 and the transceiver module 1202 in FIG. 12 may be implemented by the processor 201 in the communications device 20 shown in FIG. 3 by invoking the computer executable instructions stored in the memory 203. Alternatively, a function/implementation process of the processing module 1201 in FIG. 12 may be implemented by the processor 201 in the communications device 20 shown in FIG. 3 by invoking the computer executable instructions stored in the memory 203; and a function/implementation process of the transceiver module 1202 in FIG. 12 may be implemented by the communications interface 204 in the communications device 20 shown in FIG. 3.

The home device 120 provided in this embodiment may perform the communications methods. Therefore, for effects that can be achieved by the home device 120, refer to the foregoing method embodiments. Details are not described herein again.

Optionally, an embodiment further provides a communications apparatus (for example, the communications apparatus may be a chip or a chip system). The communications apparatus includes a processor, configured to implement the method in any one of the foregoing method embodiments. In a possible implementation, the communications apparatus further includes a memory. The memory is configured to store necessary program instructions and data. The processor may invoke program code stored in the memory, to instruct the communications apparatus to perform the method in any one of the foregoing method embodiments. Certainly, the memory may alternatively not be in the communications apparatus. When the communications apparatus is a chip system, the communications apparatus may include a chip, or may include a chip and another discrete device. This is not limited in this embodiment.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments, the computer may include the foregoing apparatus.

Although this application is described with reference to the embodiments, in a process of implementing this application that claims protection, a person of ordinary skill in the art can understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof. It is clearly that various modifications and combinations may be made to them without departing from the spirit and scope. Correspondingly, the embodiments and accompanying drawings are merely example descriptions, and are considered to include any of or all modifications, variations, combinations or equivalents thereof. A person of ordinary skill in the art can make various modifications and variations to this application without departing from the spirit and scope of the embodiments.

What is claimed is:

1. A communications method comprising:
   receiving, by a server, operation information from a home device, wherein the operation information is used to indicate an operation performed by a user on the home device;
   determining, by the server, a target account, wherein the target account is one account of a plurality of accounts associated with the home device and each account of the plurality of accounts is respectively associated with voiceprint information of a different user;
   recognizing, by the server, voiceprint information of the user based on voice instruction of the user as the operation information;
   determining, by the server based on a pre-established correspondence between voiceprint information and each account, an account corresponding to voiceprint information that best matches the voiceprint information of the user as the target account; and
   sending, by the server, a notification message to a target terminal device, wherein the notification message comprises status information used to indicate a status of the home device, the status of the home device is related to the operation information, and the target terminal device is a terminal device on which the target account is logged in.

2. The method according to claim 1, wherein determining, by the server, the target account further comprises:
   obtaining, by the server, global positioning system (GPS) location information of one or more terminal devices, wherein the one or more terminal devices are logged in by the accounts associated with the home device;
   determining, by the server, GPS location information of the one or more terminal devices that is closest to a GPS location of the home device; and
   determining, by the server, as the target account, an account logged in on a terminal device corresponding to the GPS location information closest to the GPS location of the home device.

3. The method according to claim 1, wherein before determining, by the server, the target account, the method further comprises:
   receiving, by the server, network access GPS location information, wherein the network access GPS location information is GPS location information of a network access terminal device that is present when the home device performs network access by using the network access terminal device; and
   determining, by the server, the network access GPS location information as the GPS location information of the home device.

4. The method according to claim 1, wherein determining, by the server, the target account further comprises:
   obtaining, by the server, a media access control (MAC) address of one or more terminal devices, wherein the one or more terminal devices are logged in by the accounts associated with the home device, and the one or more terminal devices and the home device are located in a same network;
   determining, by the server, a MAC address corresponding to a highest signal strength of the network in the MAC address of the one or more terminal devices; and
   determining, by the server, as the target account, an account logged in on a terminal device corresponding to the MAC address corresponding to the highest signal strength of the network.

5. The method according to claim 4, wherein obtaining, by the server, the MAC address of the one or more terminal devices further comprises:
   obtaining, by the server, a sorting result of a MAC address of the one or more terminal devices having a network connection function that are in the same network as the home device, wherein the sorting result of the MAC address is obtained based on a signal strength of the network corresponding to a MAC address of each of the one or more terminal devices, and the one or more terminal devices are logged in by the accounts associated with the home device.

6. The method according to claim 4, wherein obtaining, by the server, the MAC address of the one or more terminal devices further comprises:

sending, by the server, a MAC address related information query message to one or more first terminal devices;

receiving, by the server, MAC address related information from the one or more first terminal devices, wherein the MAC address related information comprises a MAC address of the first terminal device, an identifier of a network corresponding to the MAC address of the first terminal device, and a signal strength of the network corresponding to the MAC address of the first terminal device; and obtaining, by the server, from the MAC address related information of the one or more first terminal devices, the MAC address of the one or more terminal devices that are in the same network as the home device, wherein the one or more first terminal devices are logged in by the accounts associated with the home device.

7. A communications method, comprising:

obtaining, by a home device, media access control (MAC) address related information of one or more devices having a network connection function that are in a same network as the home device, wherein the MAC address related information is used by a server to determine a target account, the target account is one account of a plurality of accounts associated with the home device, each account of the plurality of accounts is respectively associated with voiceprint information of a different user, and the one or more devices having a wireless connection function comprise a terminal device on which the accounts associated with the home device are logged in;

recognizing, by the server, voiceprint information of the user based on voice instruction of the user as the operation information;

determining, by the server based on a pre-established correspondence between voiceprint information and each account, an account corresponding to voiceprint information that best matches the voiceprint information of the user as the target account;

sending, by the home device, the MAC address related information to the server; and sending, by the home device, operation information to the server, wherein the operation information is used to indicate an operation performed by a user on the home device; wherein a terminal device on which the target account is logged in is a target terminal device, the target terminal device is a terminal device receiving a notification message sent by the server, the notification message comprises status information used to indicate a status of the home device, and the status of the home device is related to the operation information.

8. The communications method according to claim 7, wherein the MAC address related information of the one or more devices that are in the same network as the home device comprises: a sorting result of a MAC address of the one or more devices, wherein the sorting result of the MAC address is obtained based on a signal strength of the network corresponding to a MAC address of each of the one or more devices; or a MAC address of the one or more devices and a signal strength of the network corresponding to a MAC address of each of the one or more devices.

9. A server, the server comprising a processor and a transceiver; wherein the processor is configured to:

receive operation information from a home device by using the transceiver module, wherein the operation information is used to indicate an operation performed by a user on the home device;

determine a target account, wherein the target account is one account of a plurality of accounts associated with the home device and each account of the plurality of accounts is respectively associated with voiceprint information of a different user;

recognize voiceprint information of the user based on voice instruction of the user as the operation information;

determining, based on a pre-established correspondence between voiceprint information and each account, an account corresponding to voiceprint information that best matches the voiceprint information of the user as the target account; and send a notification message to a target terminal device by using the transceiver, wherein the notification message comprises status information used to indicate a status of the home device, the status of the home device is related to the operation information, and the target terminal device is a terminal device on which the target account is logged in.

10. The server according to claim 9, wherein the processor is configured to:

obtain global positioning system (GPS) location information of one or more terminal devices, wherein the one or more terminal devices are logged in by the accounts associated with the home device;

determine GPS location information that is in the GPS location information of the one or more terminal devices and that is closest to a GPS location of the home device; and determine, as the target account, an account logged in on a terminal device corresponding to the GPS location information closest to the GPS location of the home device.

11. The server according to claim 9, wherein the processor is further configured to:

receive network access GPS location information by using the transceiver, wherein the network access GPS location information is GPS location information that is of a network access terminal device and that is present when the home device performs network access by using the network access terminal device; and determine the network access GPS location information as the GPS location information of the home device.

12. The server according to claim 9, wherein the processor is further configured to:

obtain a media access control (MAC) address of one or more terminal devices and a signal strength of a network corresponding to a MAC address of each terminal device of the one or more terminal devices, wherein the one or more terminal devices are logged in by the accounts associated with the home device, and the one or more terminal devices and the home device are located in the same network;

determine a MAC address corresponding to a highest signal strength of the network in the MAC address of the one or more terminal devices; and determine, as the target account, an account logged in on a terminal device corresponding to the MAC address corresponding to the highest signal strength of the network.

13. The server according to claim 9, wherein the processor is further configured to:

obtain a sorting result of a media access control (MAC) address of the one or more terminal devices having a network connection function that are in the same network as the home device, wherein the sorting result of the MAC address is obtained based on a signal strength of the network corresponding to a MAC address of each of the one or more terminal devices, and the one or more terminal devices are logged in by the accounts associated with the home device.

14. The server according to claim 9, wherein the processor is further configured to:

send a media access control (MAC) address related information query message to one or more first terminal devices;

receive MAC address related information from the one or more first terminal devices, wherein the MAC address related information comprises a MAC address of the first terminal device, an identifier of a network corresponding to the MAC address of the first terminal device, and a signal strength of the network corresponding to the MAC address of the first terminal device; and obtain, from the MAC address, related information of the one or more first terminal devices, the MAC address of the one or more terminal devices that are in the same network as the home device, wherein the one or more first terminal devices are logged in by the accounts associated with the home device.

15. A home device, comprising a processor and a communications interface, wherein the processor is configured to:

obtain media access control (MAC) address related information of one or more devices having a network connection function that are in a same network as the home device, wherein the MAC address related information is used by a server to determine a target account, the target account is one account of a plurality of accounts associated with the home device, each account of the plurality of accounts is respectively associated with voiceprint information of a different user, and the one or more devices having a wireless connection function comprise a terminal device on which the plurality of accounts associated with the home device are logged in;

recognize voiceprint information of the user based on voice instruction of the user as the operation information;

determine based on a pre-established correspondence between voiceprint information and each account, an account corresponding to voiceprint information that best matches the voiceprint information of the user as the target account;

send the MAC address related information to the server through the communications interface; and send operation information to the server through the communications interface, wherein the operation information is used to indicate an operation performed by a user on the home device; wherein a terminal device on which the target account is logged in is a target terminal device, the target terminal device is a terminal device receiving a notification message sent by the server, the notification message comprises status information used to indicate a status of the home device, and the status of the home device is related to the operation information.

16. The home device according to claim 15, wherein the MAC address related information of the one or more devices that are in the same network as the home device comprises:

a sorting result of a MAC address of the one or more devices,
wherein the sorting result of the MAC address is obtained based on a signal strength of the network corresponding to a MAC address of each of the one or more devices; or a MAC address of the one or more devices and a signal strength of the network corresponding to a MAC address of each of the one or more devices.

17. A communications system, comprising a server, a home device, and one or more terminal devices, wherein the home device is configured to send operation information to the server, wherein the operation information is used to indicate an operation performed by a user on the home device; the server is configured to determine a target account, wherein the target account is one account of a plurality of accounts associated with the home device, each account of the plurality of accounts is respectively associated with voiceprint information of a different user, recognize, by the server, voiceprint information of the user based on voice instruction of the user as the operation information, and determine, by the server based on a pre-established correspondence between voiceprint information and each account, an account corresponding to voiceprint information that best matches the voiceprint information of the user as the target account; and a target terminal device in the one or more terminal devices is configured to:

receive a notification message from the server, wherein the notification message comprises status information used to indicate a status of the home device, the status of the home device is related to the operation information, and the target terminal device is a terminal device that is in the one or more terminal devices and on which the target account is logged in.

18. The communications system according to claim 17, wherein the server is further configured to:

obtain global positioning system (GPS) location information of one or more terminal devices, wherein the one or more terminal devices are logged in by the accounts associated with the home device;

determine GPS location information that is in the GPS location information of the one or more terminal devices and that is closest to a GPS location of the home device; and determine, as the target account, an account logged in on a terminal device corresponding to the GPS location information closest to the GPS location of the home device.

* * * * *